Figure 1:
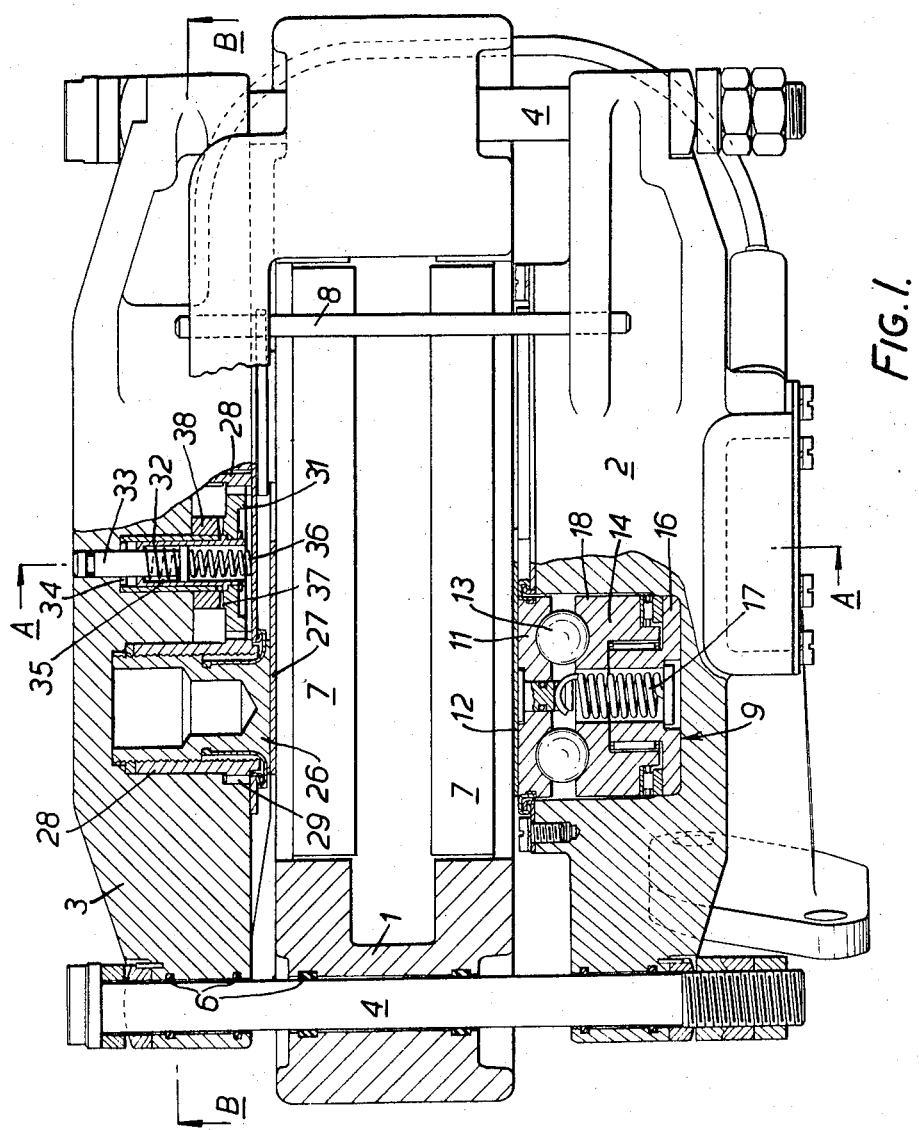

United States Patent [19]
Moss

[11] 3,835,960
[45] Sept. 17, 1974

[54] IMPROVEMENTS IN OR RELATING TO DISC BRAKES

[75] Inventor: Norman Sidney Moss, Birmingham, England

[73] Assignee: Girling Limited, Birmingham, England

[22] Filed: Dec. 16, 1971

[21] Appl. No.: 208,990

Related U.S. Application Data
[63] Continuation of Ser. No. 864,639, Oct. 8, 1969, abandoned.

[30] Foreign Application Priority Data
Oct. 11, 1968  Great Britain..................... 48419/68

[52] U.S. Cl. ........... 188/71.9, 188/72.6, 188/106 F, 188/196 BA
[51] Int. Cl............................................ F16d 65/56
[58] Field of Search ....... 188/71.9, 72.6, 72.7, 72.9, 188/106 F, 196 BA; 192/111 A

[56] References Cited
UNITED STATES PATENTS
| | | | |
|---|---|---|---|
| 3,035,664 | 5/1962 | Desivignes et al................. | 188/72.9 |
| 3,656,590 | 4/1972 | Newstead....................... | 188/73.3 X |

FOREIGN PATENTS OR APPLICATIONS
| | | | |
|---|---|---|---|
| 784,887 | 10/1957 | Great Britain..................... | 188/72.6 |
| 616,746 | 3/1961 | Canada............................. | 188/71.9 |

*Primary Examiner*—George E. A. Halvosa
*Attorney, Agent, or Firm*—Scrivener, Parker, Scrivener & Clark

[57] ABSTRACT

A reaction type disc brake having mechanical actuation means in which a pair of mechanical actuators is arranged to act on one brake pad, being spaced apart circumferentially in relation to the brake disc and operated simultaneously by a common actuating member. Another feature resides in the provision of such a brake in which one pad is directly actuated by mechanical means, and automatic adjustment means are arranged to act on the other pad, thereby separating in construction the actuation and the automatic adjustment means.

A further aspect of the invention is the provision of a reaction type disc brake in which the yoke structure is in three portions. The centre portion is mounted in use directly upon the vehicle structure and guides the brake pads for movement towards and away from the brake disc. Inboard and outboard yoke sections are coupled together by tie rod means and the mechanical actuating mechanism is mounted on one or other of these outer yoke sections so that clamping forces arising during brake actuation are transmitted by the two outer yoke sections to the tie rods, without being transmitted to the centre yoke section, whereas drag forces arising during braking are taken entirely by the centre yoke section without being transmitted to the inboard and outboard yoke sections or the tie rods. This arrangement ensures that no principle stresses greater than the stresses due to the individual reactions are developed in the structural components of the yoke.

5 Claims, 4 Drawing Figures

IMPROVEMENTS IN OR RELATING TO DISC BRAKES

This is a continuation of Ser. No. 864,639 filed Oct. 8, 1969, now abandoned.

This invention relates to reaction type disc brakes, of the type comprising a reaction structure, such as a caliper or a yoke for straddling a brake disc or discs, a pair of pads on opposite sides of the structure and mechanical actuation means for applying one said pad to one brake disc surface, the other pad being applied by reaction transmitted through the said structure. By "mechanical actuation means" we refer to arrangements in which a brake actuating force derived from a manual effort or a remote pressure fluid motor is transmitted to the actuated pad by a purely mechanical transmission.

One problem arising in disc brakes of this general form is that it is difficult to ensure that brake pads of large size are evenly applied to the brake disc surfaces.

In accordance ith one feature of the present invention, this problem is alleviated by the provision of a pair of mechanical actuators which are spaced apart circumferentially in relation to the brake disc and are arranged for simultaneous operation by a common actuating member.

A further problem arising in disc brakes of the general form first described is that of devising an arrangement to cater for automatic adjustment of the brake pads to compensate for progressive wear, without unduly complicating the construction, assembly or servicing of the brake.

However, in accordance with another feature of the invention, automatic adjustment means are arranged to act on the reaction pad, i.e., the pad which is applied in use by reaction through the reaction structure, to reposition the same relative to the reaction structure to compensate for excessive pad wear. By disposing the adjustment means on the opposite side of the brake structure from the mechanical actuation means, several advantages can be obtained. First, more space is available for fitting in the component parts of the adjustment means and the actuation means, respectively. Secondly, access to the adjustment means for setting or re-setting of the reaction pad can be greatly facilitated. Furthermore, design, manufacture and servicing of the respective mechanisms can be simplified by keeping them tructurally separated from each other, compared with known arrangements in which adjustment means are incorporated in the actuating means.

In a disc brake in which both of the abovementioned features of the invention are embodied, the adjustment means preferably comprises two adjustable abutment members for the reaction pad, aligned with the respective mechanical actuators and movable in unison and by equal amounts by a common driving member mechanically coupled to the mechanical actuation means.

This produces a balanced arrangement of the actuating and reaction forces, resulting in even wear of the brake pads and thus prolonging their useful life.

Figure 2:
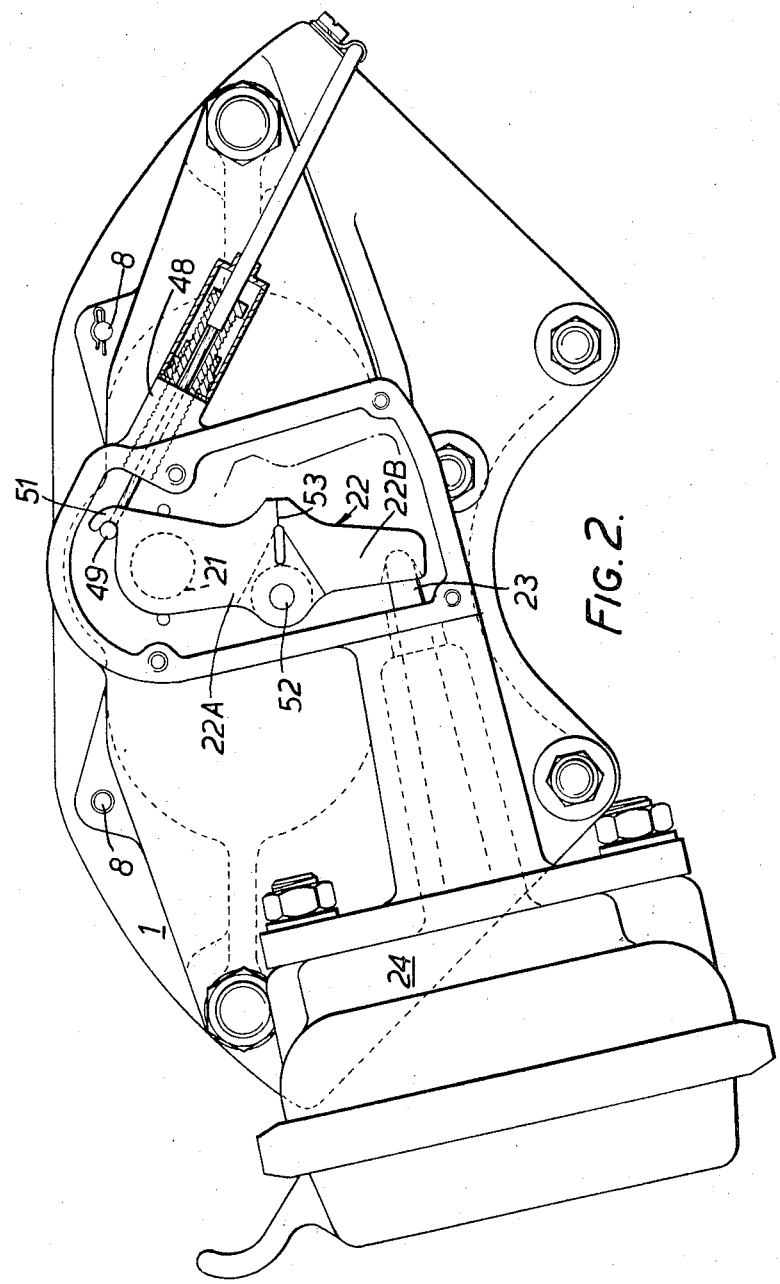
Figure 3:
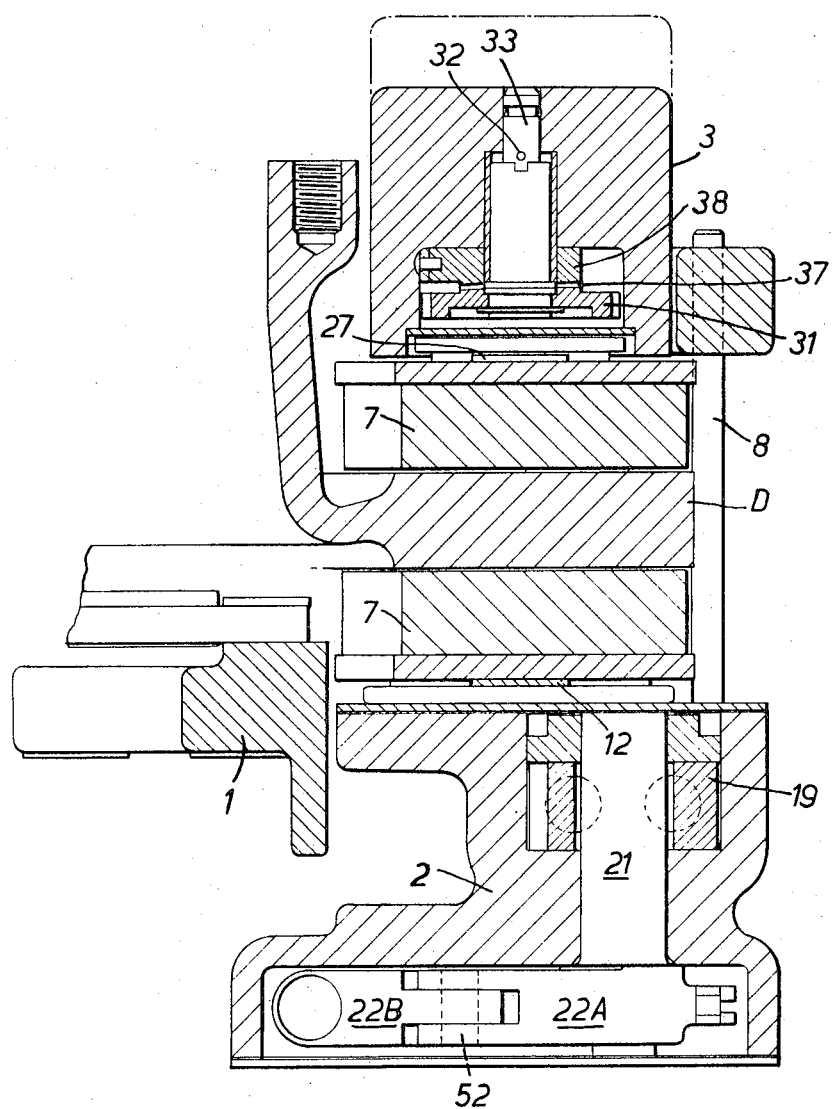
Figure 4:
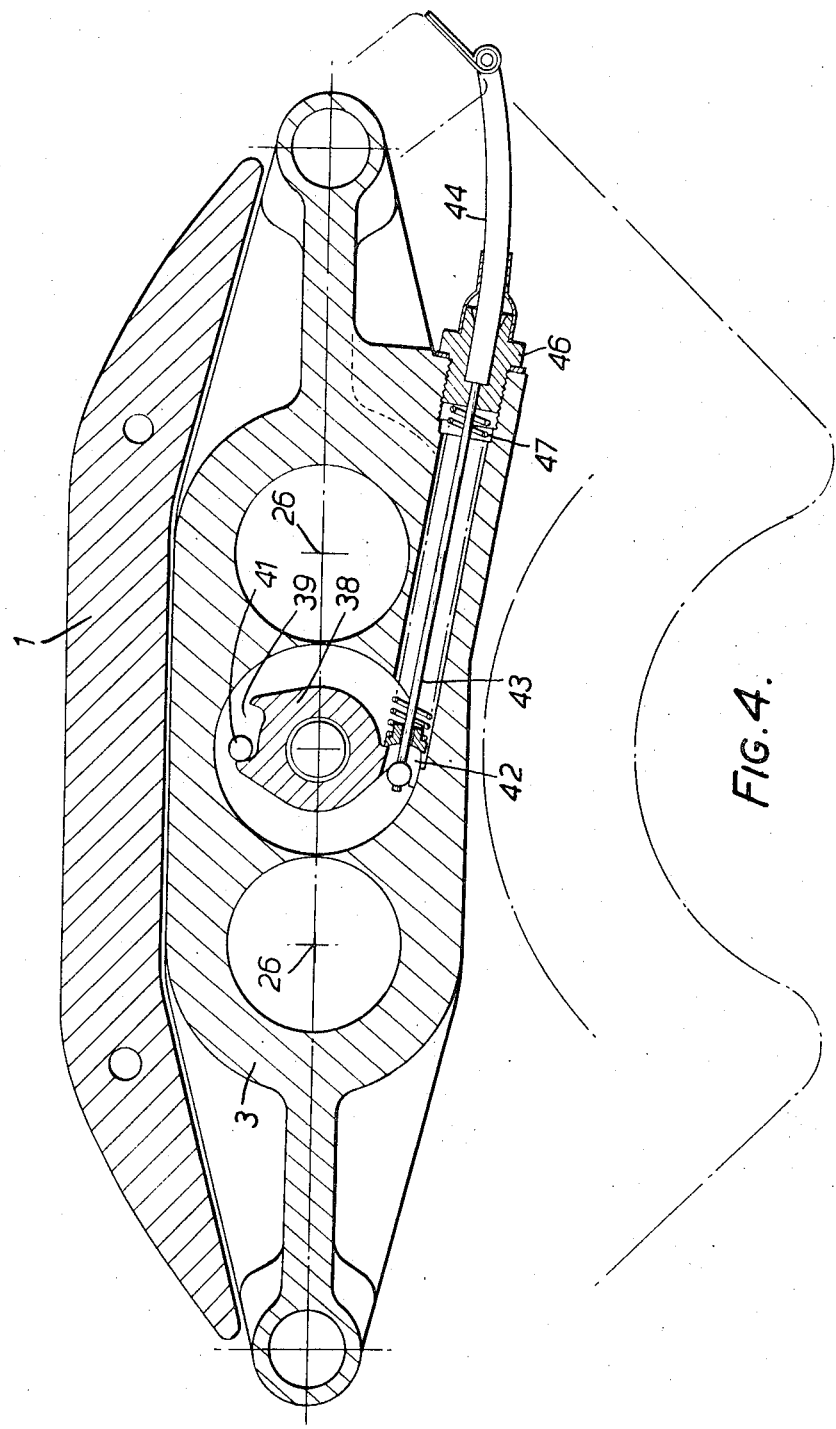

These and other features of the invention are exemplified in the following description, given by way of example only, of a reaction disc brake in accordance with the invention, the brake being illustrated in the accompanying drawings, in which:

FIG. 1 is a part sectional plan view of the brake;
FIG. 2 is a part sectional side elevation;
FIG. 3 is a section on the line AA of FIG. 1; and
FIG. 4 is a section on the line BB of FIG. 1.

The reaction structure of the brake shown in the drawings comprises a medial section 1 for attachment to a vehicle frame structure in the plane of a brake disc D, and inboard and outboard yoke sections 2 and 3 connected together by tie rods 4, the medial portions of which extend slidably through the yoke section 1. Each tie rod passes with limited clearance through holes in the yoke sections and is located in these holes by rubber O-rings 6 which form resilient bush members acting to obviate or minimise transference of bending moments to the tie rods and also prevent binding due to deflections of the inboard and outboard yoke sections when those sections are under load. A pair of brake pads 7 is mounted in partially turned gaps in the medial section 1, and retained from above by a pair of retaining pins 8 of which one is seen in FIG. 1.

The inboard yoke section 2 houses a pair of mechanical actuator assemblies 9 of which one is seen in detail in FIG. 1. Each actuator comprises an outer thrust race member 11, the outer face of which is formed with a recess to receive a keying strip 12 which engages in a similar thrust race member in the other actuator and serves to key both thrust race members 11 against rotation. A set of ball bearings 13 is positioned between the outer race member 11 and an inner thrust race member 14 which is journalled axially and radially on a boss member 16. A tension spring 17 connects the members 16 and 11, thereby acting to urge the actuator to its retracted position as shown. The ball bearings 13 are received in circumferentially tapering recesses in the respective thrust race members, so that rotation of one member relative to the other causes the balls to rise up the ramps and effect axial separation of the two race members. Both the inner race members 14 are provided on their periphery with gear teeth 18 which mesh with a common driving pinion 19 keyed on an actuator shaft 21 secured to an articulated lever 22 engageable by the push rod 23 of an actuator motor 24. Thus, as viewed in FIG. 2, operation of the actuator motor 24 causes its push rod 23 to move outwardly to the right, rotating the lever 22 and the shaft 21 in an anti-clockwise direction, so that the two inner thrust race members 14 are rotated in a clockwise direction and the outer race members 11 are pressed against the adjacent pad 7 to apply it against the adjacent face of the brake disc D. Initial clearance between the pads and the disc is taken up by bodily movement of the yoke sections 2 and 3 in an inboard direction, relative to the medial yoke section 1 and when these clearances have been taken up a braking force is applied to the disc by the two pads 7.

Thus, it will be seen that braking reaction forces perpendicular to the brake pads and parallel with the tie rods will not be transmitted to the medial yoke section 1. Furthermore, the medial yoke section, in which the brake pads are guided, transmits drag forces directly to the vehicle structure upon which the yoke section 1 is mounted, and no direct drag forces are transmitted to the tie rods.

By virtue of the fact that the tie rods are disposed in the same plane as the lines of action of the mechanical actuator assemblies, no bending moments are transmitted to the tie rods, which are therefore stressed only in tension. The resilient bushes 6 serve to recentralise the brake after brake actuation, and also act to eliminate rattle at the tie-rods.

The brake is provided with automatic adjustment means for compensating progressively for wear of the pads 7. In accordance with a feature of the invention, adjustment is effected between the pad 7 which is applied by reaction and the adjacent yoke section 3, but the drive for automatic adjustment is derived from the mechanical actuating mechanism carried by the yoke section 2.

The automatic adjustment mechanism includes two reaction abutment members 26, aligned with the respective mechanical actuators 9, the two members 26 being keyed against rotation in the yoke section 3 by a keying strip 27 received in recesses across the outer faces of the members 26. Each abutment member 26 is screw-threaded into a cup 28 rotatably mounted in the outboard yoke section 3 and being provided with a flange formed with gear teeth 29 meshing with a centrally located common drive pinion 31 carried at the end of a tubular spindle 32. A resetting spindle 33 extends into the tubular spindle 32 and has a projecting pin 34 engageable in grooves at the upper end of the spindle 32. A coil compression spring 36 normally holds the pin 34 out of the grooves, to permit free relative rotation between the spindles 32 and 33. The pinion 31 is formed on its inner end face with crown ratchet teeth 37 urged by the action of a light coil spring 35 into engagement with co-operating teeth on the drive plate 38. As best seen in FIG. 4, this drive plate has a recess 39, for engagement with a stop pin 41, and a forked hook 42 for engagement with the adjacent, headed end of the core 43 of a sheathed cable 44. An anchorage 46 for the cable is mounted on the outboard yoke section 3 and a coil compression spring 47 acts between the anchorage and the hook 42 to urge the drive plate clockwise as viewed in FIG. 4.

The cable passes around the reaction structure and as seen in FIG. 2 has its sheath secured in an anchorage 48 and the end 49 of the cable core is secured in a hook 51 at the end of lever 22.

When excessive wear of the pads has taken place, this is reflected by an abnormally large stroke of the lever 22 upon brake actuation. Angular movement of the lever 22 is transmitted by the cable core to the drive plate 38, rotating it in an anti-clockwise direction as viewed in FIG. 4. The plate 38 tends to ride over the ratchet teeth on the pinion 31, but if excessive movement of the lever 222 has taken place, the drive plate will pick up a fresh tooth on the pinion 31 and when the braking pressure is relieved, the spring 47 effects return movement of the drive plate 38 to its starting position with corresponding rotation of the pinion 31 and the cups 28. Since the reaction members 26 are keyed against rotation, they are thus caused to advance axially out of the cups, towards the disc structure D, and thereby establish a new datum position for the reaction pad 7 relative to the reaction structure.

When new shoes are to be fitted, the members 26 must be screwed back into their respective cups 28, and this is effected by inserting a screw driver in the end of the resetting spindle 33, depressing the spindle against the spring 36 to engage the pin 34 with the grooves in tubular spindle 32 and rotating the two spindles and the drive pinion 31 which in turn rotates the two cups 28. The purpose of making the actuating lever 22 as an articulated lever, as shown in FIGS. 2 and 3 may now be more readily understood. The two sections 22A and 22B of the lever are connected together by a pin 52 which passes through a fork in one lever part and a tongue in the other. Spaced from the pin 52 and extending radially thereof, are abutment faces 53 on the two lever parts. Thus, as viewed in FIG. 2 the lever can transmit thrust in an anti-clockwise direction from the actuator 24 but not in the reverse direction. On initial assembly or servicing of the brake, the end 49 of the cable core is disconnected from the lever hook 51 an the actuating mechanism properly assembled and set up. The automatic adjuster mechanism having been assembled and initial design clearances set up on the outboard side of the brake, the cable is then adjusted so that when engaged with the hook 51 the clearance between the abutment faces 53 is just taken up.

It will be understood that the degree of control over adjustment is very close because the excess travel is measured not at the pads, where the travel would be very small, but at the actuating lever, excess travel at the hooked end 51 of which is measured over a relatively large arc of a circle.

Many variations from the precise constructional details of the above described brake will, of course, be possible without departing from the scope of the present invention. For example, the prime actuating force for the brake could be derived from an hydraulic motor rather than the air motor illustrated, or from a manual effort. Also, although a single disc D has been shown it would be possible to adapt the above-described brake for co-operation with a pair of axially spaced discs, the outer faces of which are engaged by the respective pads 7 on opposite sides of the brake structure.

What is claimed is:

1. A reaction type disc brake comprising a reaction structure for straddling brake disc means having opposed brake disc surfaces, a pair of brake pads mounted on said structure for co-operation with said respective surfaces, mechanical actuation means for applying one said pad to one said surface, the other said pad being applied to the other said surface by reaction transmitted through said structure, automatic adjustment means for re-positioning said reaction brake pad relative to said reaction structure to compensate progressively for wear of said brake pads, an actuating lever pivotally mounted intermediate its ends on said reaction structure for operating said mechanical actuation means, said lever having one end operatively coupled to said automatic adjustment means and having its opposite end arranged for displacement by a power actuator, said lever comprising two separate components articulated together about a common fulcrum in such a manner that it can transmit thrust in one direction from the actuator but not in the opposite direction.

2. Disc brake as claimed in claim 1 wherein said automatic adjustment means comprises a pair of adjuster assemblies disposed side by side, and a common driving member for both said assemblies, each said assembly comprising a pad abutment member, means preventing rotation of said member relative to said reaction structure, a rotary driven member operatively connected to said abutment member to effect wear compensating adjustment thereof relative to said reaction structure, and said common driving member is operatively coupled to both said rotary driven members for effecting simultaneous operation thereof.

3. Disc brake as claimed in claim 2, including mechanical drive coupling means operatively connecting said actuation means to said common driving member, and manually operable means for interrupting said drive coupling and rotating said driving member.

4. A mechanically actuated reaction type disc brake for a disc having opposed brake disc surfaces, said brake comprising a reaction structure including parts for straddling a brake disc outwardly of the periphery thereof, a directly applied brake pad and a reaction brake pad mounted on opposite sides of the structure, and mechanical actuating means for applying said directly applied pad to one said disc surface, said reaction pad being applied to the other disc surface solely by reaction to the force produced by the directly applied pad on the one disc surface transmitted through said structure and wherein said mechanical actuating means comprises at least a pair of mechanical actuators spaced apart circumferentially of said disc and separate from the parts of said structure for straddling the disc outwardly of the periphery thereof, each actuator having its line of action extending through the disc and comprising a pair of relatively rotatable thrust members of which one is keyed against rotation relative to the reaction structure, ball and ramp means between said thrust members for urging said thrust members axially apart in response to relative rotation thereof, said other thrust member being rotatably mounted in said reaction structure and having a toothed outer periphery, and a common actuating member including a driving pinion in meshing engagement with the toothed periphery of each of said rotatable thrust members for effecting simultaneous rotation thereof, said reaction structure being constructed and arranged that it transmits reaction forces back to the common actuating member substantially in the plane containing the lines of action of the respective mechanical actuators so that the brake applying loads of the respective pads are substantially equal.

5. A mechanically actuated reaction type disc brake for a disc having opposed brake disc surfaces, said brake comprising a reaction structure including parts for straddling a brake disc outwardly of the periphery thereof, a directly applied brake pad and a reaction brake pad mounted on opposite sides of the structure, and mechanical actuating means for applying said directly applied pad to one disc surface, said reaction pad being applied to the other disc surface solely by reaction to the force produced by the directly applied pad on the one disc surface transmitted through said structure and wherein said mechanical actuating means comprises at least a pair of mechanical actuators spaced apart circumferentially of said disc and separate from the parts of said structure for straddling the disc outwardly of the periphery thereof, each actuator having its line of action extending through the disc, a common actuating member for effecting simultaneous operation of said mechanical actuators, said reaction structure being constructed and arranged that it transmits reaction forces back to the common actuating member substantially in the plane containing the lines of action of the respective mechanical actuators so that the brake applying loads of the respective pads are substantially equal, and an actuating lever pivotally mounted intermediate its ends on said reaction structure for operating said mechanical actuating means, said lever having one end arranged for displacement by a power actuator, said lever comprising two separate components articulated together about a common fulcrum in such a manner that it can transmit thrust in one direction from the power actuator but not in the opposite direction.

* * * * *